US012800452B2

(12) United States Patent
Hieta

(10) Patent No.: US 12,800,452 B2
(45) Date of Patent: Nov. 17, 2026

(54) DEVICE AND METHOD FOR DETECTING BENZENE

(71) Applicant: GASERA LTD, Turku (FI)

(72) Inventor: Tuomas Hieta, Helsinki (FI)

(73) Assignee: GASERA LTD, Turku (FI)

( * ) Notice: Subject to any disclaimer, the term of this patent is extended or adjusted under 35 U.S.C. 154(b) by 458 days.

(21) Appl. No.: 18/035,218

(22) PCT Filed: Oct. 29, 2021

(86) PCT No.: PCT/FI2021/050740

§ 371 (c)(1),
(2) Date: May 3, 2023

(87) PCT Pub. No.: WO2022/096783

PCT Pub. Date: May 12, 2022

(65) Prior Publication Data

US 2024/0011877 A1 Jan. 11, 2024

(30) Foreign Application Priority Data

Nov. 3, 2020 (FI) ..................................... 20206102

(51) Int. Cl.
*G01N 21/3504* (2014.01)
*G01N 1/40* (2006.01)

(52) U.S. Cl.
CPC .................................... *G01N 1/405* (2013.01)

(58) Field of Classification Search
CPC ............... G01N 1/405; G01N 21/3504; G01N 2021/399; G01N 2291/0427; G01N 21/39;

(Continued)

(56) References Cited

U.S. PATENT DOCUMENTS 8,302,461 B2 11/2012 Angster et al.
2017/0227428 A1 8/2017 Massengale et al.
(Continued)

FOREIGN PATENT DOCUMENTS

CN 103529115 A 1/2014
CN 104698094 A 6/2015
(Continued)

OTHER PUBLICATIONS

International Search Report and Written Opinion in Application No. PCT/FI2021/050740, mailed Jan. 21, 2022, 11 pages.

(Continued)

*Primary Examiner* — Robert R Raevis
(74) *Attorney, Agent, or Firm* — Meunier Carlin & Curfman LLC

(57) ABSTRACT

The present invention relates to a device and method for detecting benzene. In the invention, a first portion of a gas sample is supplied to a sample cell into which a light beam having a wavelength between 14.8 μm and 14.9 μm is directed, and then the energy absorbed by the first portion of the gas sample from the light beam is determined. Before the first portion of the gas sample is supplied to the sample cell, it is enriched with benzene by conveying a second portion of the gas sample through a sorption tube containing a sorbent so that benzene is transferred from the second portion of the gas sample to the sorbent, and then conveying the first portion of the gas sample through the sorption tube so that benzene is transferred from the sorbent to the first portion of the gas sample.

3 Claims, 2 Drawing Sheets

(58) Field of Classification Search
CPC ........... G01N 21/1717; G01N 29/2418; G01N 2021/1704; G01N 2021/1723; G01N 33/0047; G01N 1/2214; G01N 7/00
USPC ....... 356/437, 243.1; 73/23.21, 31.05, 31.04, 73/31.07, 863.21; 250/339.13, 379
See application file for complete search history.

(56) References Cited

U.S. PATENT DOCUMENTS

| | | | | |
|---|---|---|---|---|
| 2018/0299415 A1 | | 10/2018 | Cardin | |
| 2019/0195786 A1 | | 6/2019 | Spartz et al. | |
| 2021/0172913 A1 | * | 6/2021 | Wang | G01N 1/405 |

FOREIGN PATENT DOCUMENTS

| | | | | | |
|---|---|---|---|---|---|
| CN | 210269599 U | * | 4/2020 | | G01N 1/22 |
| GB | 2392114 A | | 2/2004 | | |
| WO | 9963337 A1 | | 12/1999 | | |

OTHER PUBLICATIONS

Search Report in Finnish Application No. 20206102, dated May 25, 2021, 2 pages.

Karhu Juho et al: "Sub-ppb detection of benzene using cantilever-enhanced photoacoustic spectroscopy with a long-wavelength infrared quantum cascade laser", Optics Letters, vol. 45, No. 21, Oct. 26, 2020 (Oct. 26, 2020), p. 5962.

Young Christina R. et al: "Infrared Hollow Waveguide Sensors for Simultaneous Gas Phase Detection of Benzene, Toluene, and Xylenes in Field Environments", Analytical Chemistry, vol. 83, No. 16, Aug. 15, 2011 (Aug. 15, 2011), pp. 6141-6147.

Siciliani De Cumis Mario et al: "A compact cantilever-based photoacoustic sensor for trace-gas detection", SPIE Proceedings; [Proceedings of SPIE ISSN 0277-786X], SPIE, US, vol. 11288, Jan. 31, 2020 (Jan. 31, 2020), pp. 112882E-112882E.

Bang Juyeon et al: "A carbon nanotube sponge as an adsorbent for vapor preconcentration of aromatic volatile organic compounds", Journal of Chromatography A, Elsevier, Amsterdam, NL, vol. 1605, Jul. 10, 2019 (Jul. 10, 2019).

* cited by examiner

DEVICE AND METHOD FOR DETECTING BENZENE

CROSS REFERENCES

This application is a U.S. national stage application of international patent application number PCT/FI2021/050740 filed on Oct. 29, 2021 claiming priority to Finnish national application number FI 20206102 filed on Nov. 3, 2020.

TECHNICAL FIELD OF THE INVENTION

The present invention relates to a device and method for detecting benzene according to the preambles of the appended independent claims.

BACKGROUND OF THE INVENTION

Benzene is an organic chemical compound that is a natural constituent of crude oil and is one of the elementary petrochemicals. It is used primarily as a precursor to the manufacture of chemicals with a more complex structure, such as ethylbenzene and cumene. Benzene is a known carcinogen and therefore its monitoring is of great importance for human health and its protection.

Various devices and methods are known for detecting benzene. Many of the most sensitive devices rely on spectroscopic detection techniques. Some of these devices are focused on the infrared band located at about 3 μm. With these devices, detection limits in the low parts-per-billion (ppb) range can be reached in optimal conditions. A problem of the benzene absorption band at 3 μm is that it has a severe spectral overlap with many other volatile organic compounds (VOCs), most importantly toluene and xylene isomers, which are typical interferents in benzene measurements. This spectral overlap increases the detection limit for benzene, i.e. it decreases the detection sensitivity.

In order to avoid the spectral overlap of benzene with the other VOCs, some of the known devices are configured to operate at longer wavelengths than 3 μm. This enables to decrease the detection limit of benzene down to the ppb level, but only when a long measuring time is used.

OBJECTIVES OF THE INVENTION

It is the main objective of the present invention to reduce or even eliminate the prior art problems presented above.

It is an objective of the present invention to provide a device and method for detecting benzene. In more detail, it is an objective of the invention to provide a device and method enabling to achieve a sub-ppb detection limit for benzene. It is a further objective of the present invention to provide a device and method enabling to detect benzene using a short measuring time. It is yet a further objective of the present invention to provide a simple and robust device for detecting benzene.

In order to realise the above-mentioned objectives, the device and method according to the invention are characterised by what is presented in the characterising portions of the appended independent claims. Advantageous embodiments of the invention are described in the dependent claims.

DESCRIPTION OF THE INVENTION

A device for detecting benzene according to the invention comprises a sample cell for receiving a first portion of a gas sample, the sample cell comprising a first window, a laser configured to emit a light beam at a wavelength between 14.8 μm and 14.9 μm into the sample cell through the first window, means for determining the energy absorbed by the first portion of the gas sample from the light beam, and means for enriching the first portion of the gas sample with benzene before it is supplied to the sample cell, the enriching means comprising a sorption tube containing a sorbent, means for conveying a second portion of the gas sample through the sorption tube so that benzene is transferred from the second portion of the gas sample to the sorbent and means for conveying the first portion of the gas sample through the sorption tube so that benzene is transferred from the sorbent to the first portion of the gas sample.

A method for detecting benzene according to the invention comprises supplying a first portion of a gas sample to a sample cell that comprises a first window, emitting a light beam at a wavelength between 14.8 μm and 14.9 μm into the sample cell through the first window, determining the energy absorbed by the first portion of the gas sample from the light beam, and before the first portion of the gas sample is supplied to the sample cell, enriching the first portion of the gas sample with benzene by conveying a second portion of the gas sample through a sorption tube containing a sorbent so that benzene is transferred from the second portion of the gas sample to the sorbent, and then conveying the first portion of the gas sample through the sorption tube so that benzene is transferred from the sorbent to the first portion of the gas sample.

The device and method according to the invention are used for detecting benzene in a gas sample. For the detection, the first portion of the gas sample is supplied to and held in the sample cell, which can be, for example, a photoacoustic cell or a multipass cell. The first portion of the gas sample is held in the sample cell during measurement. The sample cell comprises an inlet for receiving the first portion of the gas sample and an outlet for discharging the first portion of the gas sample after measurement.

The first portion of the gas sample is illuminated by the laser that emits the light beam having a wavelength between 14.8 μm and 14.9 μm. The light beam is directed into the sample cell through the first window. The laser is preferably a quantum cascade laser. The laser can be a tunable laser, allowing the wavelength of the light beam to be altered. The wavelength range between 14.8 μm and 14.9 μm is beneficial because it enables to monitor the strongest vibrational band of benzene, located at about 14.84 μm, which is free of spectral overlap from common trace gasses. In addition to being the strongest vibrational band of benzene, it is also significantly narrower than the other benzene infrared bands.

In the sample cell, the light beam interacts with the first portion of the gas sample, resulting into changes in the properties of the light beam as well as the first portion of the gas sample. During the interaction, the first portion of the gas sample absorbs energy from the light beam. The absorbed energy can be determined, for example, by measuring the pressure changes in the sample cell or the changes, such as the attenuation, in the light beam that has interacted with the first portion of the gas sample. The pressure changes can be measured, for example, with a pressure sensor that is arranged inside the sample cell. The changes in the light beam can be measured, for example, with an optical detector that is arranged outside the sample cell. In the latter case, the sample cell comprises a second window through which the light beam can be directed out of the sample cell to the optical detector.

The concentration of benzene in the first portion of the gas sample can be determined based on the absorbed energy. For this purpose, a spectrum of the absorbed energy can be determined, and the concentration of benzene can then be determined based on the spectrum. Based on the determined concentration of benzene in the first portion of the gas sample and the information, such as the duration, of the enrichment process, the concentration of benzene in the gas sample can be determined. The device according to the invention may comprise means for determining the concentration of benzene in the first portion of the gas sample based on the absorbed energy.

In the device and method according to the invention, the first portion of the gas sample is enriched with benzene before it is supplied to the sample cell. This is performed by using the sorbent in transferring benzene from the second portion of the gas sample to the first portion of the gas sample. After the enrichment, the first portion of the gas sample is supplied to the sample cell to be analysed.

The enrichment of the first portion of the gas sample with benzene is performed in two phases, namely an adsorption phase and a desorption phase. In the adsorption phase, the second portion of the gas sample is conveyed through the sorption tube so that benzene is transferred from the second portion of the gas sample to the sorbent. Preferably, during this phase the sorbent is cooled, for example, with an air-cooling unit, to enhance the adsorption process. In the desorption phase, the first portion of the gas sample is conveyed through the sorption tube so that benzene is transferred from the sorbent to the first portion of the gas sample. Preferably, during this phase the sorbent is heated, for example, with a resistive heater coiled around the sorption tube, to enhance the desorption process. The temperature of the sorbent can be monitored during the adsorption and desorption phases, for example, with a thermistor probe that is arranged inside the sorption tube. By the sorption tube is meant a collection media for sampling gases and vapours in air. An air sampling pump with a known flow rate can be attached to the sorption tube for sample collection. By the sorbent is meant a material, which can trap and retain one or several compounds in the presence of other compounds. The trapped compound(s) can be extracted out of the sorbent, for example, by means of thermal desorption. Preferably, the sorbent does not alter the trapped compound (s).

The means for enriching the first portion of the gas sample with benzene may comprise a plurality of conduits, such as pipes or hoses, for conveying the first and second portions of the gas sample through the sorption tube and for conveying the first portion of the gas sample to the sample cell. The means for enriching the first portion of the gas sample with benzene may also comprise a plurality of valves, such as three-way valves, for controlling the flow of the first and second portions of the gas sample within the plurality of conduits. The first and second portions of the gas sample can be configured to be conveyed through the sorption tube in the same or opposite directions.

An advantage of the device and method according to the invention is that they enable to achieve a sub-ppb detection limit for benzene. Another advantage of the device and method according to the invention is that they enable to detect benzene with a short measuring time. With the device and method according to the invention, the detection limit of 150 ppt (parts-per-trillion) can be achieved with a measuring time of 90 s. Still another advantage of the device according to the invention is that it is simple and robust.

According to an embodiment of the invention the means for enriching the first portion of the gas sample with benzene comprise an air-cooling unit configured to cool the sorbent. The air-cooling unit is preferably used to cool the sorbent when the second portion of the gas sample is conveyed through the sorption tube. This enhances the transfer of benzene from the second portion of the gas sample to the sorbent, i.e. it enhances the adsorption process.

According to an embodiment of the invention the means for enriching the first portion of the gas sample with benzene comprise a resistive heater coiled around the sorption tube and configured to heat the sorbent. The resistive heater comprises a conductor which converts electrical energy into heat. The resistive heater is preferably used to heat the sorbent when the first portion of the gas sample is conveyed through the sorption tube. This enhances the transfer of benzene from the sorbent to the first portion of the gas sample, i.e. it enhances the desorption process.

According to an embodiment of the invention the means for enriching the first portion of the gas sample with benzene comprise a thermistor probe attached to the sorption tube and configured to monitor the temperature of the sorbent. The thermistor probe is a temperature-sensing element which is typically encapsulated in a durable metal housing. The sorption tube may comprise a hole through which the thermistor probe is arranged inside the sorption tube. The hole in the sorption tube can be provided with a rubber seal. The temperature information provided by the thermistor probe can be utilized in the control of the resistive heater and the air-cooling unit to obtain a desired temperature during the adsorption and desorption processes.

According to an embodiment of the invention the sorbent contains at least one of the following substances: charcoal or 2,6-diphenyl-p-phenylene oxide. An advantage of these substances is that they can trap and retain benzene effectively. Preferably, the sorbent is Tenax TA sorbent.

According to an embodiment of the invention the means for determining the energy absorbed by the first portion of the gas sample from the light beam comprise a pressure sensor arranged inside the sample cell. The pressure sensor measures the pressure changes in the sample cell, which pressure changes are the result of the interaction between the light beam and the first portion of the gas sample. In this embodiment the sample cell is a photoacoustic cell.

According to an embodiment of the invention the pressure sensor comprises a cantilever and the means for determining the energy absorbed by the first portion of the gas sample from the light beam comprise an interferometer configured to measure the displacement of the cantilever. The cantilever moves like a flexible door due to the pressure changes in the sample cell. The interferometer is arranged outside the sample cell and configured to measure the displacement of the cantilever through a window in the sample cell.

According to an embodiment of the invention the sample cell comprises a second window through which the light beam is configured to pass out of the sample cell, and the means for determining the energy absorbed by the first portion of the gas sample from the light beam comprise an optical detector configured to measure the light beam that has passed through the sample cell. The optical detector measures the changes in the light beam, which changes are the result of the interaction between the light beam and the first portion of the gas sample. In this embodiment the sample cell is a multipass cell.

According to an embodiment of the invention the laser is a quantum cascade laser. The quantum cascade laser is a semiconductor laser that operates on laser transitions on intersubband transitions of a semiconductor structure.

According to an embodiment of the invention the device comprises means for cooling the quantum cascade laser. The cooling means can be configured to cool and maintain the quantum cascade laser at a desired temperature range, such as 240-260 K. The cooling means may comprise, for example, a water-cooled thermoelectric cooler or a forced air cooler.

According to an embodiment of the invention the sample cell comprises a tubular cavity. A first end of the tubular cavity is provided with the first window. A second end of the tubular cavity is either closed by the sample cell or provided with a second window. The length of tubular cavity can be, for example, 5-15 cm, 7-13 cm, or 9-11 cm. The diameter of the tubular cavity can be, for example, 1-10 mm, 2-7 mm, or 3-5 mm.

According to an embodiment of the invention the first window and/or the second window are made of ZnSe. An advantage of ZnSe is that it has a wide spectral range and low absorptivity at infrared wavelengths. One or both sides of the first window and/or the second window can be coated with an anti-reflective film.

According to an embodiment of the invention the method comprises cooling the sorbent when the second portion of the gas sample is conveyed through the sorption tube. The cooling of the sorbent enhances the transfer of benzene from the second portion of the gas sample to the sorbent, i.e. it enhances the adsorption process. The sorbent can be cooled with an air-cooling unit.

According to an embodiment of the invention the method comprises heating the sorbent when the first portion of the gas sample is conveyed through the sorption tube. The heating of the sorbent enhances the transfer of benzene from the sorbent to the first portion of the gas sample, i.e. it enhances the desorption process. The sorbent can be heated with a resistive heater that is coiled around the sorption tube.

The exemplary embodiments of the invention presented in this text are not interpreted to pose limitations to the applicability of the appended claims. The verb "to comprise" is used in this text as an open limitation that does not exclude the existence of also unrecited features. The features recited in the dependent claims are mutually freely combinable unless otherwise explicitly stated.

The exemplary embodiments presented in this text and their advantages relate by applicable parts to the device as well as the method according to the invention, even though this is not always separately mentioned.

DETAILED DESCRIPTION OF THE DRAWINGS

Figure 1:
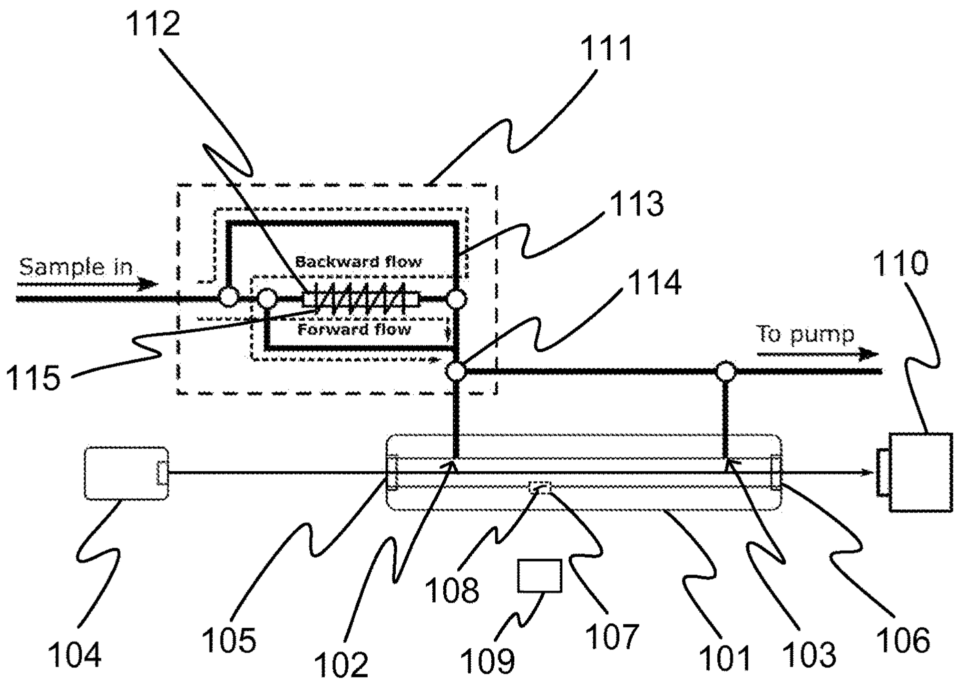
FIG. 1 illustrates a device according to an embodiment of the invention.

FIG. 1 illustrates a device according to an embodiment of the invention for detecting benzene in a gas sample. The device comprises a sample cell (photoacoustic cell) 101 for holding a first portion of the gas sample. The sample cell 101 comprises an inlet 102 for receiving the first portion of the gas sample into the sample cell 101 and an outlet 103 for discharging the first portion of the gas sample after measurement.

The device comprises a quantum cascade laser 104 that is configured to emit a light beam into the sample cell 101 through a first window 105 and out of the sample cell 101 through a second window 106. In the sample cell 101, the light beam interacts with the first portion of the gas sample, whereby the first portion of the gas sample absorbs energy from the light beam. The absorbed energy is determined by measuring the pressure changes in the sample cell 101 with a pressure sensor 107 that is arranged inside the sample cell 101. The pressure sensor 107 comprises a cantilever 108 that moves like a flexible door due to the pressure changes in the sample cell 101. An interferometer 109 is used to measure the displacement of the cantilever 108 through a measurement window (not shown in FIG. 1) in the sample cell 101. Based on the measured pressure changes, the concentration of benzene in the first portion of the gas sample can be determined. The device comprises an optical detector 110 for measuring the power of the light beam that has passed through the sample cell 101. This power information can be used to normalize the photoacoustic signal obtained from the pressure sensor 107.

The device comprises an enrichment unit 111 for enriching the first portion of the gas sample with benzene before it is supplied to the sample cell 101. The enrichment unit 111 comprises a sorption tube 112 that contains a sorbent, a plurality of pipes 113 for conveying the gas sample through the sorption tube 112 and for conveying the first portion of the gas sample to the sample cell 101, and a plurality of three-way valves 114 for controlling the gas exchange and the flow of the gas sample through the sorption tube 112. The enrichment is performed in two phases. In an adsorption phase, a second portion of the gas sample is conveyed (forward flow) through the sorption tube 112 so that benzene is transferred from the second portion of the gas sample to the sorbent. During this phase, the sorbent is cooled with an air-cooling unit (not shown in FIG. 1) to enhance the adsorption process. In a desorption phase, the first portion of the gas sample is conveyed (backward flow) through the sorption tube 112 so that benzene is transferred from the sorbent to the first portion of the gas sample. During this phase, the sorbent is heated with a resistive heater 115 coiled around the sorption tube 112 to enhance the desorption process. The temperature of the sorbent is monitored with a thermistor probe (not shown in FIG. 1) that is arranged inside the sorption tube 112.

The measurement of benzene with the device of FIG. 1 is next explained in more detail by way of an example.

Figure 2:
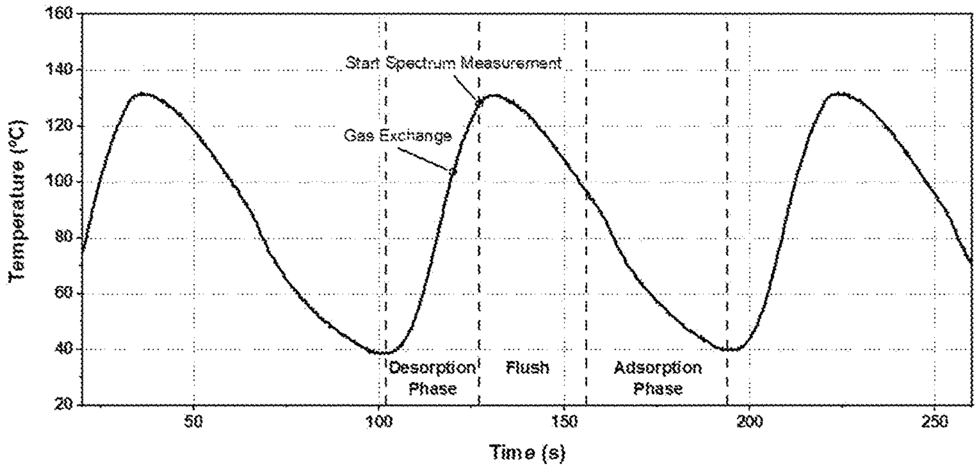
FIG. 2 illustrates the temperature of the sorbent as a function of time during a measurement cycle.

FIG. 2 illustrates the temperature of the sorbent as a function of time during a measurement cycle. Duration of the measurement cycle was approximately 90 s. Simultaneously with the adsorption phase, the spectral response of $CO_2$ and benzene was measured from the first portion of the gas sample inside the sample cell 101. The spectrum measurement takes about 64 s and during this time, benzene was collected to the sorbent by conveying the second portion of the gas sample through the sorbent in the forward flow direction. The sorbent was cooled down by using the air-cooling unit. After the spectrum had been measured, the gas flow was stopped, and the desorption phase was initiated.

During the desorption phase, the first portion of the gas sample was transferred from the sorbent volume into the sample cell 101 for another measurement. The gas from the sorbent volume was transferred passively into the sample cell 101 by first evacuating the sample cell 101 and then opening the three-way valve 114 between the sample cell 101 and the sorbent volume. To ensure that there was enough gas volume to transfer the desorbing gases throughout the sorbent, there was an extra volume of about 10 ml behind the sorption tube 112. In the beginning of the desorption phase, the sorption tube 112 was isolated from both the sample input and the sample cell 101. The sorbent was then heated with the resistive heater 115. During the heating, the sample cell 101 was evacuated to a pressure of about 150 mbar. When the temperature of the sorbent was over 100° C., the heating was stopped, and the forced air cooling was started again. The flow direction was changed into the backward flow direction and the three-way valve 114 between the sorption tube 112 and the sample cell 101 was opened. Gas from the extra volume behind the sorbent expanded through the sorbent towards the low pressure inside the sample cell 101, transporting the enriched gas sample into the sample cell 101. At this point the pressure of the sample cell 101 rose to about 440 mbar. The inlet 102 of the sample cell 101 was closed again, and the pressure of the sample cell 101 was evacuated to the measurement pressure, which in this case was 200 mbar. The low pressure was required to reduce the interference from the $CO_2$ line. A new spectral measurement was then started, and the adsorption phase was initiated.

The temperature of the sorbent reached about 130° C. at the end of the desorption phase, even after the heating was stopped. During the first 30 s after the sample transfer into the sample cell 101, while the temperature was still high, the sorbent was first flushed into the backward direction. Here the same gas sample was used for flushing, since very little benzene is retained in the sorbent when the temperature is well over its boiling point. In principle, better performance could be expected if, for example, clean nitrogen or another input equipped with carbon trap was used for the flushing, but in most practical cases the improvement would be marginal. After the 30 s flushing, the flow was switched to the forward direction. In the beginning of the adsorption phase, the temperature was still so high that a part of the adsorption time was effectively wasted, as the breakthrough volume was very small. Once the temperature of the sorbent dropped below 80° C., practically all the benzene was retained. Thus, the effective adsorption time in the measurements was about 30 s.

Figure 3:
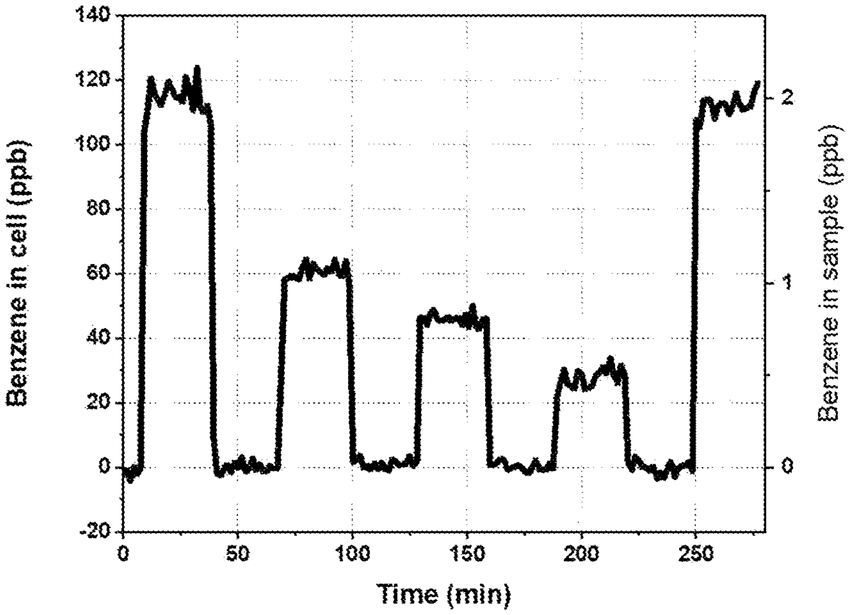
FIG. 3 illustrates the detected benzene concentration from a measurement set with varying benzene levels.

The gas sample in these test measurements was mixed down from a cylinder gas containing 1 ppm of benzene in nitrogen balance, with compressed air. The mixing ratio was controlled with mass flow controllers. The mixture was sampled from a gas flow with a total flow rate of 1 l/min. FIG. 3 shows the measurement response to varying sample concentration. Each point corresponds to one measurement cycle. The benzene concentration in the sample flow was kept constant for a duration of 30 min and then changed to a new level. This was repeated several times over a 4.5 h measurement set. For every other step, the benzene concentration was set to zero, to make sure that the zero level is retained over the measurement set. The reference benzene spectrum was measured from a 100 ppb benzene sample without the enrichment, so the left axis in FIG. 3 corresponds to the actual concentration measured inside the sample cell 101. For the right axis, the same data was fitted to a reference spectrum taken as the average of the spectra measured from the first concentration step, where the benzene concentration was set to 2 ppb. The right axis then corresponds to the actual sample concentration.

Comparing the axis in FIG. 3 shows that the enrichment enhanced the signal by a factor of 57. The flow rate into the device was about 0.5 l/min. When the temperature of the sorbent was below 80° C., nearly all benzene was retained, as the breakthrough volume would be larger than the volume flow over one measurement period. Based on this, the effective adsorption period was about 30 s. Therefore, it can be estimated that benzene contained in about 0.25 l volume of sample was captured in one adsorption period. If it is assumed that all of this was transported into the sample cell 101 by the gas expanding through the sorption tube 112 during the desorption phase, a maximum for the enhancement factor can be calculated. The final pressure inside the sample cell 101 was about 440 mbar and the volume of the sample cell 101 was about 8 ml. Ignoring the temperature difference of about 20 K, the benzene contained in a gas volume of 0.25 l was effectively measured from a gas volume of 3.52 ml, giving an enhancement factor of 71. This is in a reasonable agreement with the observed enhancement.

The largest standard deviation within one concentration step was for the first level, where one standard deviation ($1\sigma$) corresponded to a sample concentration of 66 ppt. For the zero levels, $1\sigma$ was 30 ppt or less, within one individual step. Between the different zero level sets, $1\sigma$ of their averages was 11 ppt. This suggests that there is slight drifting in the concentration measurement over the measurement period of 4.5 h, as the average over 30 min should drop the noise level by a factor of 4.5, compared to a single 90 s measurement, instead of the observed factor of 2.7.

Figure 4:
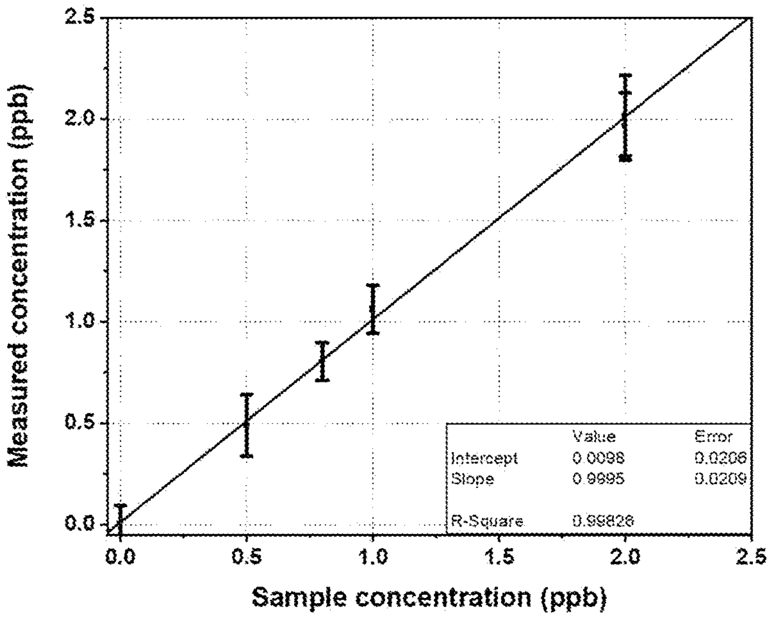
FIG. 4 illustrates the concentration response as a function of the known sample concentrations.

The average sample concentrations for the other steps were used to construct a calibration curve shown in FIG. 4. The error bars are three times the standard deviation ($3\sigma$). The calibration curve demonstrates a good linearity over the measured concentration range. As an estimate for a detection limit, the $3\sigma$ for the 0.5 ppb step, which was the lowest measured concentration, was 150 ppt.

Only advantageous exemplary embodiments of the invention are described in the figures. It is clear to a person skilled in the art that the invention is not restricted only to the examples presented above, but the invention may vary within the limits of the claims presented hereafter. Some possible embodiments of the invention are described in the dependent claims, and they are not to be considered to restrict the scope of protection of the invention as such.

The invention claimed is:

1. A method for detecting benzene, wherein the method comprises:

supplying an enriched first portion of a gas sample to a sample cell that comprises a first window, emitting a light beam at a wavelength between 14.8 μm and 14.9 μm into the sample cell through the first window, determining the energy absorbed by the enriched first portion of the gas sample from the light beam, and before the enriched first portion of the gas sample is supplied to the sample cell, enriching an unenriched first portion of the gas sample with benzene by:

conveying a second portion of the gas sample through a sorption tube containing a sorbent so that benzene is transferred from the second portion of the gas sample to the sorbent, and then conveying the unenriched first portion of the gas sample through the sorption tube so that benzene is transferred from the sorbent to the unenriched first portion of the gas sample to form the enriched first portion of the gas sample.

2. The method according to claim 1, wherein the method further comprises cooling the sorbent when the second portion of the gas sample is conveyed through the sorption tube.

3. The method according to claim 1, wherein the method further comprises heating the sorbent when the first portion of the gas sample is conveyed through the sorption tube.

* * * * *